United States Patent [19]

Alexander

[11] Patent Number: 4,624,828
[45] Date of Patent: Nov. 25, 1986

[54] METAL-ACTINIDE NITRIDE NUCLEAR FUEL

[75] Inventor: Carl A. Alexander, Grove City, Ohio

[73] Assignee: Battelle Memorial Institute, Columbus, Ohio

[21] Appl. No.: 566,596

[22] Filed: Dec. 29, 1983

[51] Int. Cl.⁴ ............................................. G21C 3/58
[52] U.S. Cl. .................................. 376/421; 376/412; 376/422; 376/457; 423/251; 423/254; 423/256; 252/640; 252/641
[58] Field of Search .............. 376/412, 414, 457, 421, 376/422; 423/254, 256, 251; 252/640, 641

[56] References Cited

U.S. PATENT DOCUMENTS

| | | | |
|---|---|---|---|
| 3,976,749 | 8/1976 | Wedemeyer | 423/256 |
| 4,029,740 | 6/1977 | Ervin | 423/254 |
| 4,059,539 | 11/1977 | Potter | 252/641 |

*Primary Examiner*—Donald P. Walsh
*Attorney, Agent, or Firm*—Klaus H. Wiesmann

[57] ABSTRACT

The invention discloses a metal-actinide mononitride composition with dimensional stability in extended nuclear reactor operations, with a method of operation at surface temperatures in excess of 1700° C. The preferred embodiment and operating method uses a mononitride of uranium and a metal selected from the group consisting of titanium or yttrium. Parameters for determination of the metal element to stabilize the fuel are disclosed.

6 Claims, No Drawings

METAL-ACTINIDE NITRIDE NUCLEAR FUEL

TECHNICAL FIELD OF THE INVENTION

This invention relates to a nuclear reactor fuel element. More specifically, this invention relates to a dimensionally stable high temperature metal-actinide nitride nuclear reactor fuel element.

BACKGROUND ART

In recent years endeavors have been made to find a nuclear fuel which is compact and produces high temperatures. Such a fuel is of particular value in a nuclear reactor for use in outer space. It is impractical to use metallic uranium for a fuel in such a reactor. This is because of its low melting point and phase changes. Alternative proposals to build stabilized fuels for fast breeder reactors have centered upon the use of uranium dioxide, uranium carbide, and uranium nitride. Also corresponding compounds of thorium, plutonium, or a combination of these elements with uranium fuels have been used.

Compatibility is a consideration involved with the selection of any nuclear fuel. The fuel itself must be compatible with the cladding material in which it is contained. The fuel must also be compatible with any materials added to it, such as refractory metals. The addition of a non-compatible element to the fuel may prevent the formation of a satisfactory cermet. For example, carbide nuclear fuels have very limited compatibility with all common materials at elevated temperatures. Another example of incompatibility is present in a composition of uranium mononitride with calcium nitride. The physical properties of this material initially appear to be within the parameters identified for this invention as being required to stabilize a uranium mononitride fuel. However, this material, unlike the nitrides of many transition metals, prevents the formation of a satisfactory cermet with uranium mononitride. Consideration of a material's thermal conductivity compatibility must also be made. Those materials that transfer heat by conduction through electrons have increased thermal conductivity and are preferred over materials that transfer heat primarily by phonon induction. Increased thermal conductivity improves the utility of a nuclear fuel.

Uranium dioxide ($UO_2$) is a very forgiving material. Without problems of significant corrosion to cladding materials or deterioration of cermet formation, it has been shown to be compatible with stainless steels, refractory metals, and even other ceramics. It is relatively stable and easy to fabricate. It possesses a complex vapor phase and has nearly the poorest thermal conductivity of any potential nuclear fuel. It can be operated for extended periods of time, but only at low temperatures. At high temperatures its operational time is greatly decreased.

In a breeder reactor both the carbide and nitride nuclear fuels have proven greatly superior to uranium dioxide. A comparison is given in Table I in which a uranium/plutonium mix is used.

TABLE I

| FUEL TYPE | POWER KW/ft |
|---|---|
| $UPuO_2$ | 11 |
| UPuC | 32 |
| UPuN | 44 |

As can be seen, there is a gain in power levels over oxide fuels by a factor of approximately three for carbides and a factor of approximately four for nitrides. Carbide fuels are cheaper to make and easier to fabricate than are nitride fuels. Nitride fuels are superior to carbide fuels in two environments. The first case is when the surface temperature does not exceed 1350° C. Nitrides retain fission products at these temperatures. Swelling is less than would be expected because much of it is contained in the porosity of the fuel. Carbides are not as strong. The second case is where the surface temperature exceeds 1600° C. At these temperatures nitride fuel is superior, not because of swelling characteristics, but for its compatibility. Carbides have been shown to have decreased compatibility with additional elements at elevated temperatures when compared to nitrides, see, C. A. Alexander, J. J. Ward, J. S. Ogden, and C. W. Cunningham, "Carbides in Nuclear Energy", MacMillian, 190 (1964). Because it is desired to have prolonged periods of use at high temperatures in a nuclear reactor used in outer space, nitrides are the fuels disclosed in this invention.

Uranium mononitride (UN) is attractive as a nuclear reactor fuel element because of its ability to operate at high temperatures. This quality makes it attractive for use in fast reactors, especially those designed to operate in outer space. Uranium mononitride has a high uranium density and occupies approximately thirty percent less volume than uranium dioxide ($UO_2$) at an equivalent uranium content. uranium mononitride also has a high thermal conductivity. However, a limiting factor of UN, which mitigates against its use, is its disassociation into liquid uranium and nitrogen gas under reduced pressures at higher temperatures. As is well known liquid uranium is extremely corrosive. Liquid uranium's presence within a fuel cell can cause damage and even rupturing of the cell's cladding. The presence of nitrogen gas formed upon the disassociation of uranium mononitride fuel increases the pressure within a fuel cell. As disassociation continues, an equilibrium nitrogen pressure is reached which limits the reaction. The presence of nitrogen gas within a fuel cell can cause the cell to swell.

Attempts to overcome this problem have centered upon increasing the strength of the cladding material from which the fuel cell is made, venting gases to the exterior assembly, and evenly distributing the porosity throughout the fuel material so that the fission gases formed are contained within the fuel. Still other attempts to find a dimensionally stable uranium mononitride fuel have focused upon adding additional elements to the refractory metal matrix which decrease the disassociation of uranium nitride into liquid uranium and nitrogen gas.

Examples where additional elements are mixed with uranium nitride to form a more stable fuel include: U.S. Pat. No. 4,059,539—Potter et al., in which a uranium-zirconium mononitride composition is used as a fuel and U.S. Pat. No. 3,661,709—Chubb et al., in which particles of uranium nitride and particles of a cermet of uranium nitride together with tungsten are used in a fuel. In either of these examples prolonged operating temperatures could not exceed 1650° C. The upper limits of short term operating temperatures with these elements are reported to be 1700° C. and 1800° C., respectively.

It is an object of this invention to provide a nuclear fuel or use at high temperatures for prolonged periods of time which is dimensionally stable without significant decreases in thermal conductivity.

It is an additional object of this invention to provide the governing parameters for selection of alloys to be used with uranium mononitride to produce a dimensionally stable nuclear fuel for use at high temperatures.

It is still another object of this invention to provide a homogeneous single phase uranium mononitride composition having improved thermal stability.

SUMMARY OF THE INVENTION

In summary, this invention is a dimensionally stable nuclear reactor fuel element for extended operation at surface temperatures in excess of 1700° C. made from a solid solution of a nitride of a radioactive actinide including, for example, uranium, thorium, or plutonium with a metal nitride. A method of operating nuclear reactors for extended periods of time above 1700° C. is not known in the prior art.

The invention is a dimensionally stable nuclear fuel which operates at high temperatures for extended periods of time. This fuel preferably comprises uranium mononitride combined with a compatible metal nitride to form a solid solution of a metal-uranium nitride. The heat of formation of the metal nitride must be between $-60$ to $-90$ kilo calories per gram formula weight. The metal must have a heat of vaporization less than that of uranium. It is desirable that the metal has a melting point greater than that of uranium. A nitride of a metal having a melting point less than uranium, will stabilize uranium mononitride when the sum of its heat of vaporization and the absolute value of the heat of formation of the metal into a nitride is below uranium's heat of vaporization and the absolute value of the heat of formation of uranium into a nitride. Suitable metal nitrides include those selected from the group consisting of titanium and yttrium.

The foregoing and other advantages of the invention will become apparent from the following disclosure in which a preferred embodiment of the invention is described in detail. It is contemplated that variations in structural features and arrangement of parts may appear to the person skilled in the art, without departing from the scope or sacrificing any of the advantages of the invention.

BEST MODE FOR CARRYING OUT THE INVENTION

The preferred embodiment of this invention forms a stablized uranium mononitride composition by the addition of an element which has a heat of vaporization less than uranium and a heat of formation to a nitride between $-60$ to $-90$ kilo calories per gram formula weight. Elements for use in this invention are from the transition metal group, the rare-earthmetal group, or the actinide metal group. An element with a melting point below that for uranium can be used to stabilize a nuclear fuel when the sum of its heat of vaporization and the absolute value of the heat of formation of the metal into a nitride is below uranium's heat of vaporization and the absolute value of the heat of formation of uranium into a nitride. An example of such an element is plutonium. An element used in the preferred embodiment of this invention is from the group consisting of titanium and yttrium. These elements have the desirable property of having melting points greater than that of uranium. A uranium mononitride composition having a compatible element fitting within these parameters will form a nuclear reactor fuel which can operate for prolonged periods of time above 1700° C.

Table II provides a comparison of the parameters of the elements used in the preferred embodiment and contemplated alternative embodiments of this invention.

TABLE II

| Element | $\Delta Hf^*$ at 25° C. | mp °C. | $\Delta Hv^*$ | $|\Delta Hf| + \Delta Hv^*$ |
| --- | --- | --- | --- | --- |
| Uranium | −71 | 1133 | 126 | 197 |
| Plutonium | −72 | 641 | 82 | 154 |
| Titanium | −73 | 1660 ± 10 | 102.5 | 175.5 |
| Yttrium | −80 | 1523 ± 8 | 94 | 174 |

*Kilo-cal/g formula wt.

A metal-uranium mononitride composition according to this invention is significantly more stable than a pure uranium mononitride fuel, when prepared in concentrations of five mole percent or less. At higher concentrations the stability of the fuel becomes greatly enhanced to the point where continued operating temperatures can exceed 1700° C. Higher concentrations are limited only by the point where the benefits of added stability of the uranium mononitride composition are exceeded by the diminished uranium content of the composition. For the intended objects of this invention, concentrations between ten to twenty mole percent are desirable.

Table III is provided for a better understanding of the benefits of this invention. Table II identifies the activity of uranium and plutonium in solid solution. It is well known that the presence of plutonium increases the stability of uranium mononitride. Temperature ranges are given in relation to the activity of these two elements. An activity of about 0.78 must be reached before a molten phase of uranium appears.

TABLE III*

| ACTIVITY OF URANIUM AND PLUTONIUM $U_{.8}Pu_{.2}N$ SOLID SOLUTION | | | |
| --- | --- | --- | --- |
| Temperature | | Activity | |
| K | C | Uranium | Plutonium |
| 1600 | 1327 | .06 | .015 |
| 1800 | 1527 | .21 | .032 |
| 2000 | 1727 | .51 | .044 |
| 2200 | 1927 | .61 | .056 |
| 2400 | 2127 | .78 | .062 |

*At 2400 K. incipient liquid would form.

As seen in Table III, by forming a solid solution of two nitrides the activity of the individual constituents readjust and by discovery and inclusion of the appropriate second nitride it is possible to completely suppress liquid formation of uranium. See C. A. Alexander, J. S. Ogden, and W. M. Pardue, Nuc. Met Soc, AIME 17, 95, (1970). The current invention replaces the potentially toxic plutonium nitride used in Table III with another metal. Table IV illustrates the effects on the activity of uranium in the preferred embodiment of this invention using yttrium in a composition with uranium mononitride. This activity is given for three different concentrations of yttrium. As can be seen, yttrium at even lower concentrations greatly stablizes uranium mononitride and permits a nuclear fuel to operate without the formation of liquid uranium at temperatures higher than that thought possible in the prior art. The metal nitrides disclosed in this invention provide added stability to other actinides. Because of uranium mononitride's complex phase characteristics, the use of this invention to stabilize this fuel is of particular value. This invention is also of value in stabilizing plutonium nitride fuels and preventing during their use the vaporization of plutonium.

TABLE IV*

ACTIVITY OF URANIUM IN UN-YN$_{-x}$ SOLID SOLUTIONS

| Temperature | | Activity of Uranium | | |
|---|---|---|---|---|
| °K. | °C. | 5 m/o YN$_{-x}$ | 10 m/o YN$_{-x}$ | 20 m/o YN$_{-x}$ |
| 1800 | 1527 | .045 | .022 | .01 |
| 2000 | 1727 | .089 | .043 | .019 |
| 2200 | 1927 | .137 | .068 | .032 |
| 2400 | 2127 | .234 | .113 | .053 |

*An activity of about 0.78 must be reached before a molten phase appears.

The heat of vaporization and the heat of formation of the nitride of titanium indicate that a titanium mononitride addition works approximately the same as yttrium mononitride for stabilizing uranium mononitride. The melting points of these two metals are above that of uranium. Because either of these metals has a melting point higher than uranium or plutonium, their presence in a composition with these actinides also increases the stability of such a solid solution by elevating the melting point of the composition.

The addition of yttrium nitride in an uranium nitride composition causes some loss of thermal conductivity. This is also true with the use of titanium. Electrons carry almost all the heat in the nitrides. Those losses in thermal conductivity that do occur, are not greatly dissimilar to that obtained from a uranium-plutonium mononitride. A comparison of the uranium mononitride compositions to that of uranium dioxide compositions shows that thermal conductivity is approximately a factor 10 greater for the nitrides than for the oxides. The use of yttrium, titanium, or other elements within the parameters listed below should be consistent with these results.

These important parameters are: (i) the metal nitride has a standard heat of formation from its elements at 25° C. of −60 to −90 kilo-cal/g mole; (ii) the metal has a melting point greater than that of uranium; and (iii) the metal has a heat of vaporization less than that of uranium.

A yttrium-uranium mononitride has been shown to produce a compact high temperature, high power density nuclear reactor fuel. Titanium has a known compatibility with uranium mononitride and its other physical properties are within the above parameters. This makes it an attractive alternative embodiment of this invention.

A solid solution nitride composition as contemplated by the invention can be prepared jointly or as separate nitrides which are subsequently blended. Numerous methods exist for preparing uranium mononitride and other nitrides. Examples of such methods are illustrated in U.S. Pat. No. 3,804,928—Chang, U.S. Pat. No. 3,345,436—Craig, and U.S. Pat. No. 3,758,669—Potter. The carbothermic process and the metal hydride process are two general methods of preparing the nitrides and will be outlined briefly.

The carbothermic process mixes the powder of the oxide of the metal to be nitrided with carbon in the ratio of one atom of carbon per each atom of oxygen present. This mixture of oxide and carbon powder is heated to a temperature in excess of 900° C., but less than 1700° C., with in-flowing nitrogen at a nominal one atmosphere pressure. As the carbon reacts with the oxygen from the oxide, the nitrogen is free to react with the metal. A typical reaction would react 80 grams of titanium dioxide ($TiO_2$) with 24 grams of carbon. This reaction would result in the formation of 62 grams of titanium mononitride (TiN). The carbon monoxide by-product is continuously swept away during this reaction. This reaction is demonstrated by the following formula: $TiO_2 + 2C + \frac{1}{2}N_2 = TiN + 2CO$. The replacement in the alternative embodiment of the titanium metal in this formula with yttrium or other contemplated metals will not change the ratio of this formula or the reaction.

The metall hydride process is one where uranium is hydrided to form a friable powder. This process can occur at a few hundred degrees centigrade with vigor, but proceeds slower at lower temperatures. After hydriding, the temperature is raised to about 900° C. or higher and nitrogen is introduced. The replacement reaction is as follows: $UH_3 + 1\frac{1}{2}N_2 = UN + 3/2H_2$. The nitride produced by this process is very pure and fine grained. Some care in cooling is necessary to prevent formation of $U_2N_3$. A programmed evacuation of the nitrogen overpressure with temperature cool down will prevent this formation. Nitrides can be formed from prealloyed metals by the above processes.

Nitride powder prepared from either the oxide or the metal hydride generally needs further processing. A suggested procedure for this further processing is the ball-mill operation. The powder is loaded into the ball-mill with a pure hydrocarbon, such as distilled hexane. The powder is wet milled from 24 to 48 hours to produce a powder of micron sized particles. This powder can be hot pressed under a nitrogen overpressure or cold pressed with a binder and subsequently sintered at temperatures from 1600° C. to 2200° C. The temperature/time relationship of either the hot press or sinter operation determines density. The nitride alloys so produced can then be further transformed into the reactor fuel elements desired. Methods to produce such elements are conventional in the art and not a necessary part of this disclosure. A suitable method for the preparation of fuel bodies is disclosed in U.S. Pat. No. 3,306,957—McLaren, et al.

Potential cladding materials for use with nuclear fuels made according to this invention for extended operation at surface temperatures of 1500° C. and above would be molybdenum tungsten or rhenium as well binary or ternary alloys. For operation with such fuels up to 1500° C. cladding materials in addition to the above alloys may include niobium, columbium, or tantalum. Below 1500° C. creep and nitrogen reaction is sufficiently low to make these materials attractive. Mixed nitride powder can also be compacted with powders of the above metals to make a homogeneous fuel element for space applications or other applications with compact high power density reactors.

In order to provide a better understanding of the present invention, examples relating to the stabilization of actinide nitride nuclear fuels with other nitrides within the parameters of this invention are set forth below.

EXAMPLE I

A uranium alloy containing a 20 mole percent of yttrium is hydrided by a process known within the art into a friable powder. The powder is heated above 900° C. and nitrogen is introduced. A very pure and fine grained powder of (UY)N is produced. This powder is carefully cooled to prevent the formation of $U_2N_3$ by slow evacuation of the nitrogen overpressure. The resultant composition is ball-milled by standard procedures to obtain a desirable particle size. Particle sizes of between 0.1 to 5 microns are satisfactory. The material is then fabricated into rods and exposed to a sintering schedule to produce a cermet of even porosity and density.

EXAMPLE II

The method recited in Example I is repeated beginning with an uranium alloy containing a 20 mole percent of titanium.

EXAMPLES III and IV

The method recited in Example I is repeated beginning with an uranium-plutonium alloy containing a 10 mole percent of yttrium. The presence of yttrium in the resultant (UPuY)N composition will stabilize the uranium during continued operation of the reactor at high temperatures preventing formation of a liquid phase and stabilize the plutonium to prevent its vaporization. Example IV uses the same method as recited in Example I to stabilize the plutonium nitride and prevent the vaporization of plutonium during continued operation of the reactor at high temperatures.

It is herein understood that although the present invention has been specifically disclosed with the preferred embodiment and examples, modifications and variations of the concept herein disclosed may be resorted to by those skilled in the art. Such modifications and variations are considered to be within the scope of the invention and the appended claims.

I claim:

1. An improved refractory metal-uranium mononitride nuclear reactor fuel element for extended operation at high surface temperatures, comprising:
   a. uranium mononitride; and
   b. a nitride of a metal compatible with said uranium mononitride in which:
      i. said metal nitride has a standard heat of formation from its elements at 25° C. of −60 to −90 kilocal/g mole;
      ii. said metal has a melting point greater than that of uranium; and
      iii. said metal has a heat of vaporization less than that of uranium.

2. An improved metal-uranium mononitride nuclear fuel as recited in claim 1 wherein said metal to form said nitride is from a group consisting of titanium and yttrium.

3. An improved metal-uranium mononitride nuclear fuel as recited in claim 1 wherein a mole percent concentration of said metal is high enough to stabilize said uranium mononitride from disassociation into liquid uranium and nitrogen gas at a desired operating temperature and said concentration is less than that which would adversely effect a desired uranium concentration of said fuel element.

4. An improved metal-uranium mononitride nuclear fuel as recited in claim 3 wherein said concentration of said metal is from 2 mole percent to 25 mole percent.

5. An improved metal-uranium mononitride nuclear reactor fuel element for extended operation at surface temperatures in excess of 1700° C., comprising:
   a. uranium mononitride; and
   b. a metal mononitride selected from the group consiting of titanium and yttrium.

6. A method of operating a nuclear reactor at a temperature at which uranium mononitride fuel decomposes to free uranium and nitrogen, the improvement which comprises using a metal-uranium mononitride composition where said metal is selected from a group consisting of titanium and yttrium, said composition containing at least 10 mole percent of said metal; and operating said reactor at a temperature in excess of 1700° C., said metal-uranium mononitride composition being a solid solution and having a homogeneous single-phase structure.

* * * * *